United States Patent
Pelkey et al.

(10) Patent No.: US 7,930,711 B2
(45) Date of Patent: Apr. 19, 2011

(54) APPARATUS AND METHOD FOR ADDRESSING CONTROL IN A NETWORK FOR DISTRIBUTED DATA

(75) Inventors: Gary L. Pelkey, Woodstock, GA (US); Jeff Simyon, Alpharetta, GA (US)

(73) Assignee: Wegener Communications, Inc., Duluth, GA (US)

(*) Notice: Subject to any disclaimer, the term of this patent is extended or adjusted under 35 U.S.C. 154(b) by 0 days.

(21) Appl. No.: 10/382,389

(22) Filed: Mar. 6, 2003

(65) Prior Publication Data

US 2004/0177368 A1     Sep. 9, 2004

(51) Int. Cl.
H04N 7/16     (2011.01)
H04L 27/30    (2006.01)
H04B 7/185    (2006.01)
G06F 12/14    (2006.01)
H04K 1/00     (2006.01)

(52) U.S. Cl. .............. 725/25; 725/31; 726/29; 726/30

(58) Field of Classification Search .......... 725/25, 725/26, 31, 32–36, 151, 152; 726/29, 30
See application file for complete search history.

(56) References Cited

U.S. PATENT DOCUMENTS

| | | | | |
|---|---|---|---|---|
| 4,518,989 A | | 5/1985 | Yabiki et al. ............... 358/86 |
| 4,538,176 A | | 8/1985 | Nakajima et al. ........... 358/86 |
| 4,558,464 A | * | 12/1985 | O'Brien, Jr. ................ 380/240 |
| 4,903,031 A | | 2/1990 | Yamada ...................... 342/359 |
| 4,985,895 A | | 1/1991 | Pelkey ........................ 371/37.7 |
| 5,029,232 A | | 7/1991 | Nall ............................ 455/2 |
| 5,036,537 A | | 7/1991 | Jeffers et al. ............... 380/20 |
| 5,235,643 A | | 8/1993 | Anderson et al. .......... 380/33 |
| 5,260,778 A | * | 11/1993 | Kauffman et al. .......... 725/33 |
| 5,381,477 A | * | 1/1995 | Beyers et al. ............... 380/231 |
| 5,410,344 A | * | 4/1995 | Graves et al. .............. 725/46 |
| 5,440,632 A | * | 8/1995 | Bacon et al. ................ 380/242 |
| 5,565,909 A | * | 10/1996 | Thibadeau et al. ......... 725/35 |
| 5,594,490 A | | 1/1997 | Dawson et al. ............. 348/6 |
| 5,651,115 A | | 7/1997 | Hasebe et al. .............. 395/200.09 |
| 5,710,815 A | * | 1/1998 | Ming et al. ................. 380/241 |
| 5,758,257 A | * | 5/1998 | Herz et al. .................. 725/116 |
| 5,764,773 A | * | 6/1998 | Nishiura ..................... 380/212 |
| 5,768,539 A | * | 6/1998 | Metz et al. .................. 709/249 |
| 5,815,662 A | | 9/1998 | Ong ............................ 395/200.47 |
| 5,828,402 A | | 10/1998 | Collings ..................... 348/5.5 |
| 5,835,911 A | * | 11/1998 | Nakagawa et al. ......... 707/203 |
| 5,886,733 A | | 3/1999 | Zdepski et al. ............. 348/13 |
| 5,914,756 A | * | 6/1999 | Maeda et al. ............... 348/563 |
| 5,973,723 A | | 10/1999 | DeLuca ...................... 348/9 |
| 6,040,850 A | | 3/2000 | Un et al. ..................... 348/10 |
| 6,108,365 A | * | 8/2000 | Rubin et al. ................ 375/130 |

(Continued)

*Primary Examiner* — Christopher Kelley
*Assistant Examiner* — Reuben M Brown
(74) *Attorney, Agent, or Firm* — Robert C. Haldiman; Husch Blackwell LLP

(57) ABSTRACT

In a content data distribution network, a system for directing control instructions to selected ones of a plurality of receivers. The system comprises a stored value, stored in a memory location reserved for at least one local parameter in each of the plurality of receivers. An uplink distributes to the plurality of receivers over said content data distribution network a transmitted value. The system compares the stored value and transmitted value such that a True value corresponds to the selected ones of the plurality of receivers at which the control instructions are to be executed. Comparisons may be made to functions of the stored values. Comparisons may be made to multiple stored values. Multiple comparisons may be connected together with boolean operators. The stored values can be changed by the transmitted control instructions.

30 Claims, 4 Drawing Sheets

U.S. PATENT DOCUMENTS

| | | | |
|---|---|---|---|
| 6,230,163 B1 | 5/2001 | Thijssen | 707/200 |
| 6,272,549 B1 | 8/2001 | Daniel | 709/246 |
| 6,415,329 B1 | 7/2002 | Gelman et al. | 709/245 |
| 6,425,127 B1 | 7/2002 | Bates et al. | 725/32 |
| 6,430,233 B1 | 8/2002 | Dilon et al. | |
| 6,463,059 B1 | 10/2002 | Movshovich et al. | 370/389 |
| 6,470,498 B1 | 10/2002 | Reber et al. | |
| 6,487,723 B1 * | 11/2002 | MacInnis | 725/132 |
| 6,510,454 B1 | 1/2003 | Walukiewics | 709/206 |
| 6,516,376 B1 | 2/2003 | Christine et al. | |
| 6,671,881 B1 * | 12/2003 | Tamer et al. | 725/31 |
| 2001/0055305 A1 | 12/2001 | Oz et al. | 370/389 |
| 2002/0023143 A1 | 2/2002 | Stephenson et al. | 709/218 |
| 2002/0059256 A1 | 5/2002 | Halim et al. | 707/10 |
| 2002/0059641 A1 | 5/2002 | Tsujimura et al. | |
| 2002/0059642 A1 | 5/2002 | Russ et al. | |
| 2002/0066099 A1 | 5/2002 | Ohno | |
| 2002/0069295 A1 | 6/2002 | Edwards et al. | 709/246 |
| 2002/0083441 A1 | 6/2002 | Flickinger et al. | 725/32 |
| 2002/0095600 A1 | 7/2002 | Deen et al. | 713/201 |
| 2002/0095676 A1 | 7/2002 | Knee et al. | 725/46 |
| 2002/0104097 A1 | 8/2002 | Jerding et al. | 725/115 |
| 2002/0108126 A1 | 8/2002 | Horowitz et al. | |
| 2002/0112076 A1 | 8/2002 | Rueda et al. | 709/245 |
| 2002/0120944 A1 | 8/2002 | Wasilewski | |
| 2002/0129383 A1 | 9/2002 | Wasilewski | |
| 2002/0138554 A1 * | 9/2002 | Feigen et al. | 709/203 |
| 2002/0147977 A1 | 10/2002 | Hammett et al. | |
| 2002/0168178 A1 | 11/2002 | Rodriguez et al. | |
| 2002/0178360 A1 | 11/2002 | Wenocur et al. | 713/170 |
| 2002/0184529 A1 | 12/2002 | Foster et al. | 713/201 |
| 2002/0184651 A1 | 12/2002 | Matsushita | 725/131 |
| 2002/0194595 A1 | 12/2002 | Miller et al. | 725/36 |
| 2002/0196365 A1 | 12/2002 | Cho et al. | |
| 2002/0198001 A1 * | 12/2002 | Bajikar | 455/456 |
| 2002/0199001 A1 | 12/2002 | Wenocur et al. | 709/227 |
| 2002/0199096 A1 | 12/2002 | Wenocur et al. | 713/153 |
| 2003/0005449 A1 | 1/2003 | McKenna et al. | 725/78 |
| 2003/0005454 A1 | 1/2003 | Rodriguez et al. | |
| 2003/0009694 A1 | 1/2003 | Wenocur et al. | 713/201 |
| 2003/0018912 A1 | 1/2003 | Boyle et al. | 713/201 |
| 2003/0028899 A1 | 2/2003 | MacInnis | |
| 2003/0046700 A1 | 3/2003 | Wilcox et al. | |
| 2003/0093790 A1 | 5/2003 | Logan et al. | |
| 2003/0110511 A1 | 6/2003 | Schutte et al. | |
| 2003/0110514 A1 | 6/2003 | West et al. | |
| 2003/0126612 A1 | 7/2003 | Ikeda et al. | |
| 2003/0159157 A1 | 8/2003 | Chan | |

* cited by examiner

APPARATUS AND METHOD FOR ADDRESSING CONTROL IN A NETWORK FOR DISTRIBUTED DATA

CROSS-REFERENCE TO RELATED APPLICATIONS

None.

STATEMENT REGARDING FEDERALLY SPONSORED RESEARCH OR DEVELOPMENT

Not Applicable.

APPENDIX

Not Applicable.

BACKGROUND OF THE INVENTION

1. Field of the Invention

This invention is in the field of content data distribution networks, especially satellite broadcast network video and audio data.

2. Related Art

Networks such as satellite broadcast television must control the distribution of content data such as television programs in order to distribute that content to the areas, groups of viewers and classes of subscribers that are intended to receive it, at the proper time and place. Multiple variables must be accommodated, such as geographic location, subscription groups, pay per view access and supplemental content, in order that the proper receivers and their users receive that programming they are supposed to receive and not other programming. Individual receiver equipment must be identified in a way that uniquely identifies users and associates the receivers with further parameters such as location and group participation.

Content data distribution networks by definition include a central dispersion source, such as a satellite uplink for broadcast television. They also include multiple receiver nodes, such as satellite receiver/decoders for broadcast television. In some systems there may be further distribution from the nodes, such as cable television services that distribute the programming received from a satellite. Typical control systems for known content data distribution networks involve complex lists of all unique receivers and/or users in memories at the central dispersion source, or uplink. Various parameters, for example zip code locations of receivers, further complicate the stored information. Operation requires complex searching algorithms at the uplink, and requires complex transmission of involved control instructions to the network. The uplink searching operations necessitate nontrivial amounts of time for processing through large databases. The resulting transmission of control instructions to the network uses significant amounts of bandwidth, especially in cases where the command is intended to be executed by large numbers of receiver sites.

These problems are somewhat solved by using a "grouping" scheme wherein the receiver units themselves perform said "database" lookup and filtering functions. Using groups of Boolean logic, likewise the receivers in effort distributes the database and processing among multiple sites thus saving time and bandwidth. However, said "grouping" schemes are not appropriate for all cases. For example, if the relevant information is directed to indicating what (U.S.) state the receiver is located in, each receiver would have 50 bits reserved in a look up memory for United States geographic distribution and each bit would correspond to one of the 50 states. Which ever bit was configured to designate the state the receiver was actually located in would be set and the other 49 bits would be clear. If a transmitted control instruction were to be executed by receivers in a particular state, each receiver across the country would receive the signal, scan the 50 bits reserved for state location, find the bit for the state indicated in the transmitted control instruction and check to see if that bit was set or clear. It was known to connect a second look up operation to the first with a Boolean operator.

If, as in the example, the parameter was a small one, for example 50 bits could store indicators for 50 states in only 7 bytes of memory, the lookup table technique was not problematic. However, where more complex parameter information needs to be stored, non trivial volumes of memory, processing power and execution time were required. For example, lookup tables for all of the zip codes in the United States requires a significant amount of memory, processing and time.

There is a need in the art for a control system that minimizes the processing time, memory volume and bandwidth required to accurately control proper access to all programming, or other content data.

U.S. Pat. No. 4,985,895 to Pelkey, the inventor of the present invention, discloses a "Remote Controlled Receiving System Apparatus and Method." It is incorporated by reference herein. It discloses an addressing system in which an individual receiver/decoder for a content data distribution system ("receiver") retains its own group membership information, which may include membership in multiple groups. Addressing was simply a matter of determining if a serial number equaled a desired serial number, or determining if a group membership indicator equaled a desired group membership indicator. Addressing could combine groups with the Boolean operators AND, OR and NOT.

Prior art addressing, including the '895 patent, has been limited in that the comparison of a transmitted addressing signal with address information in a receiver was no more complex than checking for equivalency.

Even in light of the '895 patent, then, there remains a need in the art for a control system that minimizes the processing time, memory volume and bandwidth required to accurately control proper access to all programming, or other content data. More particularly, there is a need for increasing the functional addressing processing executed at receivers, to augment control, economy, precision, scalability, flexibility, speed and efficiency.

Most digital content data distribution systems work according to common familiar concepts. Multiple content data streams, video, audio or data, are divided into packets, multiplexed, transmitted and routed for use to various receivers. The MPEG2 protocols are illustrative of the class, and are referred to herein as characteristic of the embodiments discussed herein. The Moving Picture Experts Group (MPEG) is the expert group of the International Organization for Standardization (ISO) that has defined the MPEG-2 standard protocol. Other protocols such as MPEG1 or DSS are alike in function although they vary in detail. Each standard is known in the art.

At some point, the video and audio content data, and other digital information must be multiplexed together to provide encoded bitstreams for delivery to the target destination. The Systems portion of the MPEG-2 standard (ISO/IEC 13818-1) defines how these bitstreams are synchronized and multiplexed together. The video portion of the MPEG-2 standard (ISO/IEC 13818-2) sets forth the manner in which pictures and frames are defined, how video data is compressed, various syntax elements, the video decoding process, and other information related to the format of a coded video bitstream. The audio portion of the MPEG-2 standard (ISO/IEC 13818-3) similarly describes the audio compression and coding techniques utilized in MPEG-2. Typically, video and audio data are encoded at respective video and audio encoders, and the resulting encoded video and audio data is input to an MPEG-2 Systems encoder/multiplexer. This Systems multiplexer can also receive other inputs, such as control instructions, management information such as authorization identifiers, private data bitstreams, and time stamp information. The resulting coded, multiplexed signal is referred to as the MPEG-2 transport stream.

The control instructions discussed herein may be transmitted among the transport stream or transmitted on a separate channel. Control instructions are generally known. Some are disclosed in U.S. Pat. No. 4,985,895 to Pelkey. They include, without limitation, instructions to play, block, play supplemental data such as subtitles, play advertisements, play content according to a schedule, billing recording, status information return, mute, change frequency, change decryption seeds, and the like.

The video and audio encoders provide encoded information to the Systems multiplexer in the form of an "elementary stream". These elementary streams are "packetized" into packetized elementary streams which are comprised of many packets. Each packet includes a packet payload corresponding to the content data to be sent within the packet, and a packet header that includes information relating to the type, size, and other characteristics of the packet payload.

Elementary stream packets from the video and audio encoders are mapped into transport stream packets at the Systems encoder/multiplexor. Each transport stream packet includes a payload portion which corresponds to a portion of the elementary packet stream, and further includes a transport stream packet header. The transport stream packet header provides information used to transport and deliver the information stream, as compared to the elementary stream packet headers that provides information directly related to the elementary stream. Each transport packet header includes a packet identifier (PID) to identify the digital program or elementary stream to which it corresponds. Within the transport packet header is a packet identifier (PID), which is a 13-bit field used to identify transport packets which carry elementary stream data from the same elementary stream, and to define the type of payload in the transport packet payload.

Before the transport stream is decoded, the transport packets must undergo analysis, synchronization, demultiplexing, as well as other packet manipulating functions. These functions can be managed by devices such as a MPEG transport demultiplexor, in a known fashion.

Control instructions are typically sent in packet format, as a payload with content data or separately.

SUMMARY OF THE INVENTION

The invention is an addressing system for control instructions and content data in a content data distribution system such as satellite broadcast television. Integrated receiver/decoder units ("receivers") may be identified by any of a variety of scaleable, configurable parameters, including without limitation general parameters such as membership in groups of receivers, geographic location, listings on programming schedules, subscriptions to programming packages, and also operational parameters generally reflecting the status of the receiver, such as which channel is on, what audio is set or the position of relays. Each receiver/decoder unit in a distribution network has a memory having multiple locations in it. In the memory locations are stored values characteristic of the receivers identity relative to each configured local parameter, such as its particular zip code, billing status, or group membership.

The multiple receivers receive a data transport stream from a content data distribution network, typically through a central distribution point such as a satellite uplink. The data transport stream, such as the multiplexed packet stream of a DVB network, includes packets of control instructions and packets of content data. Content data is typically video and audio data, but may also be supplemental data, executable data such as Internet data or other data such as voice communications. Packets of content data may also contain control instructions.

Associated with the control instructions in the data transport stream are addressing bits that interact with the data held in the memory locations of the individual receivers. The control instruction addressing bits identify the locations storing the parameter values for individual receivers. The control instruction addressing bits include a transmitted value(s) defining the corresponding individual receivers at which certain control instructions are to be executed, or content data is to be played. The control instruction addressing bits may commonly identify the locations storing the parameter values by including a local parameter location identifier, which may be an address, that corresponds to a location in a memory in each individual receiver.

In the receiver a processor compares the transmitted value defining the receivers at which the associated control instructions are to be executed to the stored values of the local parameters for that individual receiver. The comparison is according to an operator. The comparison operator may be transmitted with the control instruction packet or its addressing bits. The comparison operator may be typified by familiar comparison operators such as "greater than," "greater than or equal to," "lesser than," "lesser than or equal to," "equal to" and "not equal to." Other, more complex functions may execute the comparison. The value transmitted is an amount to which the value stored in the memory location is compared.

Memory locations need not contain voluminous lookup tables. Instead, binary numerical values are stored. These stored values correspond to local information parameters. For example, rather than a bit being designated for each zip code in the U.S., and set for receivers in that zip code, each zip code is assigned as a numerical value one or more bytes reserved for that parameter. All 10,000 American zip codes are then storable in 4 bytes, instead of the 1250 bytes occupied by a look up table large enough to store the same information.

At an uplink, transmissions of control instructions custom tailored for the proper receivers to which the instructions are directed may be created simply by entering into the data transport stream a control instruction packet with addressing bits in an "atom" comprised of a memory location identifier, a comparison operator and a transmitted value. The transmitted value, defines those receivers at which the control instruction will be executed when comparison of it to the stored value according to the comparison operator returns a "True" comparison.

When the transmitted value compares favorably, according to the transmitted comparison function, to the value stored in the designated memory location of the individual receiver, a "true" comparison is registered and the control instruction is executed or the programming authorized for play. If the comparison is "false," it is not. Thus, processing is distributed to the myriad individual receivers where a simple, fast comparison is executed, and transmission bandwidth is preserved by reducing the volume of control instruction bits transmitted. Memory volume demands are reduced.

The present invention further promotes flexibility and power by adding a capacity for downloadable functionality. In addition to comparison of a transmitted value to a simple stored value, the present invention provides for the comparison to be made to a function of the stored value. The addressing atoms may include a function, that is, an arithmetic or logical function, executable on the stored value to provide a result. The result is compared to the transmitted value according to the comparison operator. These functions may evaluate a result based on multiple stored or transmitted values.

The addressing atoms are scalable, flexible and complex in that they may be connected by Boolean operators. That is, a atom may be linked in the data transport stream with another atom, and with multiple further atoms. The linkage of atoms may be by simple operators such as AND, OR or NOT, or the linkages may also be by more complex functions.

BRIEF DESCRIPTION OF THE DRAWINGS

The accompanying drawings, which are incorporated in and form a part of the specification, illustrate the embodiments of the present invention and together with the description, serve to explain the principles of the invention.

DETAILED DESCRIPTION OF THE PREFERRED EMBODIMENTS

The present invention is particularly advantageous in digital multimedia communications systems implementing the MPEG standards such as the MPEG-1 (ISO/IEC 11172) and MPEG-2 (ISO/IEC 13818) standards, and in data transport stream applications relating to digital video in broadband networks. The present invention may be applicable to many digital communication environments such as MPEG-1, DSS, DVB, DVB/ASA, STCE and the like. Asynchronous modulation techniques such as FSK, BPSK, or QPSK may also be used. However, an appreciation of the invention is best obtained in the context of the following diagrams, in which an MPEG-2 transport stream receiver and decoder system is shown according to the present invention.

Figure 1:
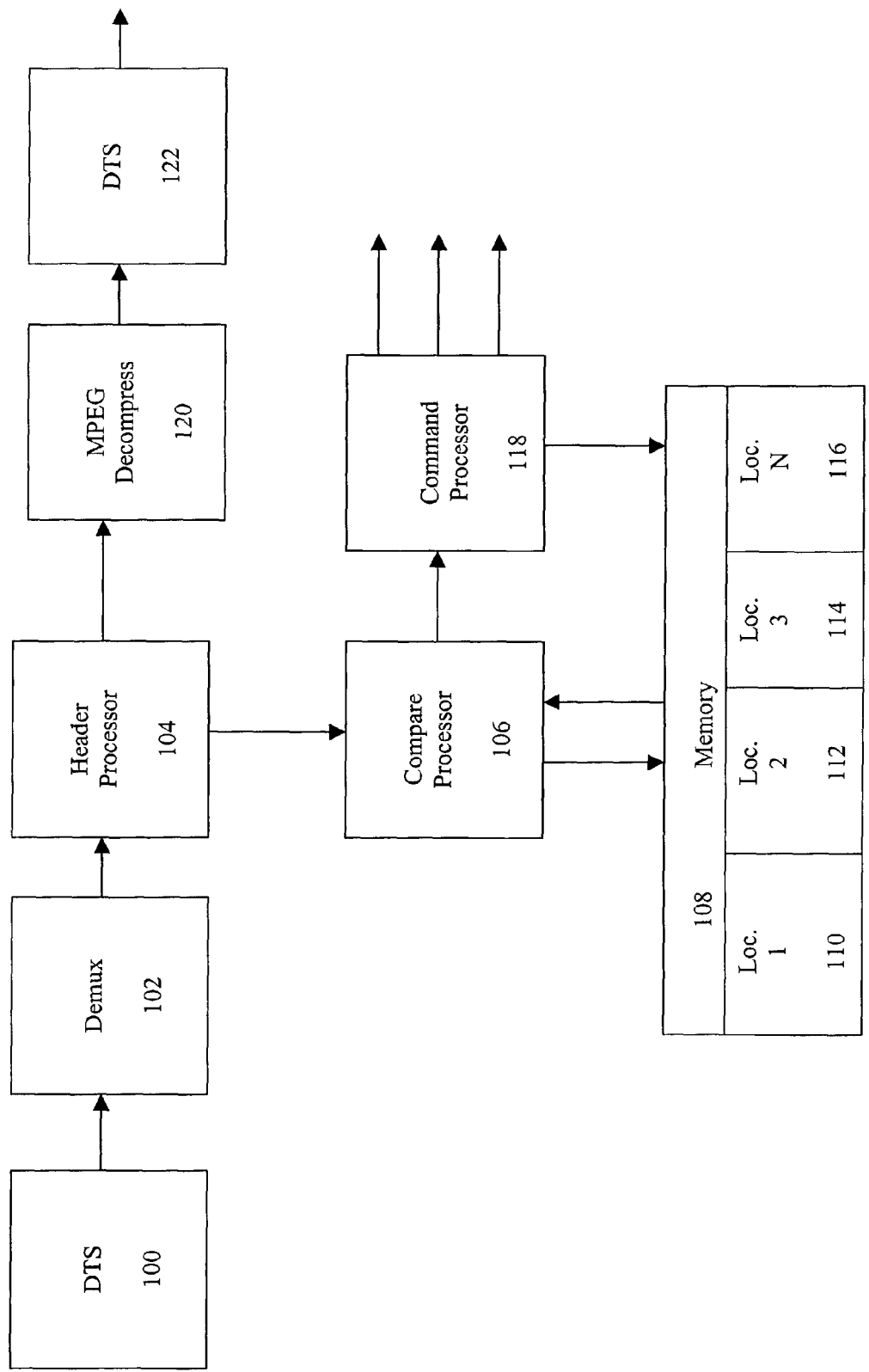
FIG. 1 is a block diagram depicting components in a receiver necessary for executing the present invention.

Referring now to the figures in which like reference numbers correspond to like elements, FIG. 1 is a block diagram depicting fundamental logic components necessary for execution of the present invention in a receiver for a content data distribution network. While the invention may be applied to a receiver associated with the network distributing content data via satellite broadcast, terrestrial broadcast, cable distribution, Internet distribution or otherwise, the embodiment depicted herein as indicative of the principals of the present invention is an integrated receiver/decoder for a digital video broadcasting network. Further details of such a system are disclosed in U.S. Pat. No. 4,985,895 to Pelkey, and in application Ser. No. 10/368,546, "Apparatus and Method for Single Encryption with Multiple Authorization of Distributed Content Data" to Livaditis et al. filed Feb. 18, 2003, which are incorporated by reference herein. FIG. 1 does not depict all the components of a receiver, but rather depicts those elements necessary for execution of the content addressing system of the present invention. Appropriate processors, memories and other components for practicing the present invention are known. By way of illustration, applicable components may be found on an ATX motherboard.

A data transport stream 100 is received for processing from the integrated receiver/decoder's receiving components. Data packets containing control instructions may be embedded in an MPEG transport stream or may be received on separate data channels. The data stream is de-multiplexed, 102 and its header information is processed 104.

A processor 106 executes a compare function more fully described hereinafter. The processor may be a configured portion of a micro processor that performs many tasks. The microprocessor alternatively may be part of a larger MPEG decompression chip. The processor may be a Field Programmable Gate Array, an Application Specific Integrated Chip (ASIC), or processing may be executed through software, provided that the processor is configured to execute the comparison operations described below.

The compare processor 106 is in operative communication with a memory 108. The memory may be a flash memory or otherwise. It may be a portion of a larger general purpose memory, or a dedicated memory. The memory 108 is further divided into various locations indicated at 110, 112, 114 and 116. Each location is scaleable and may be configured to accommodate whatever quantum of information is appropriate to the particular local parameter information stored in it. The number of locations is also scalable for executing as many control parameters as desired "stored value" means the local parameter information stored in a memory location.

For example, if all zip codes in the United States are to be available for the execution of control instructions, one memory location would be a 4 byte portion of memory. For each individual receiver, the zip code in which it is deployed will be entered in the zip code memory location. Accordingly, that memory location will store the exact individual zip code for the individual receiver/decoder in which it is stored. If the state in which the receiver is deployed is to be stored in memory, a second memory location may be created. A single byte would be sufficient for recording in which of the 50 states of the United States the individual receiver is deployed. The individual zip code is a first shared value held in a first memory location for zip codes. The state number is a second stored value in a second memory location.

General parameter memory locations may be configured to identify the individual receiver's relationship with particular groups according to geography, subject matter, billing designations and the like. Some memory locations will be populated with appropriate data at the factory. For example, one memory location will contain an unchangeable unique individual serial number for the individual receiver. Other memory locations may be loaded with descriptive data at the factory. Upon set up as a part of a particular network—for example a retail chain subscribing to a particular music service, or as a receiver for a particular cable television distributor—other memory locations may be loaded with further descriptive data. Control instructions in the data transport stream may be used to redesignate some or all of the data contained in various memory locations. In other words, the stored value for any local parameter (except the serial number) may be changed by transmitted control instruction. Current values for operational parameters such as mute on or off, frequency or channel use, may be automatically stored in their respective memory locations, as identified by the depicted communication between general processor 118 and memory 108.

After the processor 106 has executed the comparison as described below, the data packet is forwarded to a command processor 118 for execution of any control instructions received in the data packet, if they are to be executed at that receiver according to the comparison. Because control instructions can be sent to execute actions in many different logic components or devices, three arrows outbound from command processor 118 serve to designate any of the relevant destinations for control instructions. Data packets containing content data will be forwarded to an MPEG decompressor 120, as appropriate, in order that the digital transport stream 122 may be output for play, display or availability of data for any other purpose. Compare processor 106 or, alternatively, command processor 118, or a general processor, will include an address parser used in executing the control instructions that are contained in the control data packets.

Figure 2:
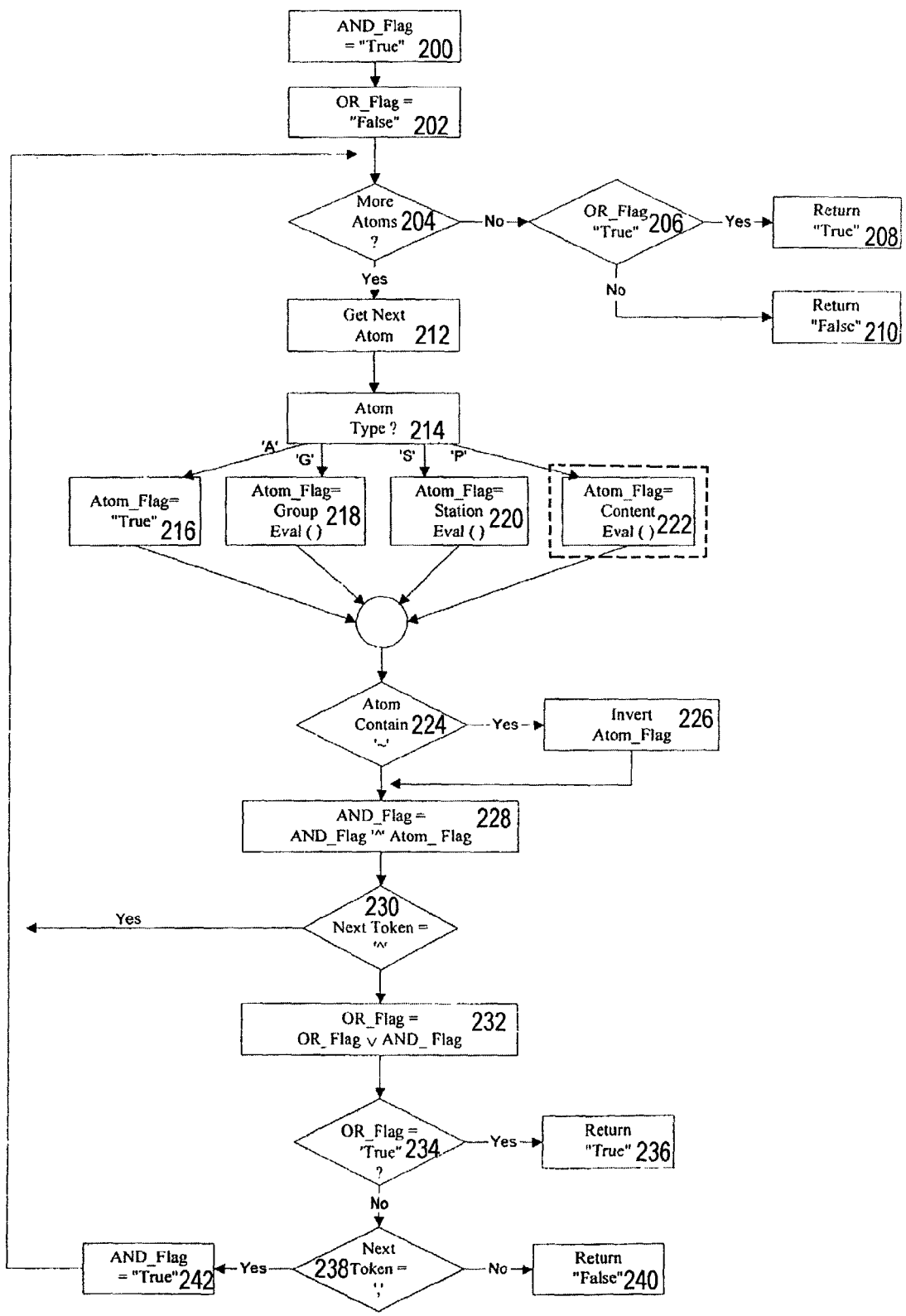
FIG. 2 is a flow chart depicting a packet processing in a receiver.

FIG. 2 is a flow chart of the address parsing processing that occurs in header processor 104. Of course, the address content evaluation system of the present invention may be deployed to be the sole address parsing in other embodiments, or in combination with conventional address parsing, or combined with other address parsing systems.

The control instructions are addressed to varying sets and/or subsets of the receiver/decoder units. A description of a set of receiver/decoders that is to receive, or not receive, a particular control instruction is an "atom." An "atom" may include all receiver/decoders. The set of all receiver/decoders is indicated by "A". A group of receiver/decoders that are to receive a control instruction may be identified by individual receivers' group membership parameters, indicated by "G". Groups may be defined by geography, usage, classes, subscription groups, retail chain affiliations or the like. Groups are numbered, and have distinct memory locations. Group number designations may be set at the factory, at installation, or may be reset by the receipt of transmitted control instructions. A "station" may be an individual receiver/decoder, most commonly identified by serial number. The serial number is factory set, corresponds to a printed serial number on the back of a hardware unit, and in the depicted embodiment, is six digits long. Hence, an atom for an individual receiver/decoder would be S123456. Station designation atoms are indicated by "S".

Finally an atom may also describe a set defined by an evaluation of the values stored in the local parameter memory locations as described herein. When memory location content evaluation is executed for defining a set of receiver/decoders that is to receive (or not receive) execution of a control instruction, the atom type is designated "P". Content evaluation is exemplified by the atoms disclosed more fully herein.

As is also more fully described herein, P atoms that evaluate content values of memory locations according to the present invention may be connected with Boolean operators. Such a connection of P atoms is to be distinguished from the connection of A, G or S type atoms with Boolean operators. This distinction is hereby designated for use herein by referring to "A, G, S and P atom types as "atoms," and by referring to atoms used for memory location content evaluation, which are of the form of {[location(s)] [operator] [value]}, as content atoms.

In FIG. 2, an initializing flag is automatically set in front of the first atom, being a true AND flag, 200 or a false OR flag, 202. In either case, address parsing checks 204 for the presence of more atoms. If there are none, and the OR flag is true, or exists between two previously parsed atoms, then a true result is returned 208 and the packet is forwarded to general processor 118 for further processing and, in the case of control instructions, execution of control instruction. If the OR flag evaluated at step 206 is not true, a "false" indication is returned 210 and general processor 118 will not execute any control instruction contained in the data packet.

If more atoms do exist 204 the address parser retrieves the next atom 212. The atom type is evaluated 214. If the atom type is "A" for all receiver/decoders, the atom type is automatically parsed as true 216. If the atom type is "G" then the group is evaluated 218. In the depicted embodiment, as has been known, "G" atoms execute group evaluation by looking for a group flag that is set or clear in a look up table. If the individual receiver/decoder is a member of a particular group, then the bit corresponding to that group in the look up table is set. If the individual receiver/decoder is not in a group, the bit designated to correspond to that group in the look up table for that individual receiver/decoder is clear.

Station evaluation step 220 in the depicted embodiment may also proceed according to look up table review as has been known. Preferably though, station ID will be a stored serial number and "S" atom station evaluation is by a simple check for equivalency of that stored value with the transmitted value that defines the proper receiver. Again, according to the present invention, more complex operators than "equal to" may be applied to station serial numbers, as is described below as "P" atom evaluation.

Next the address parser checks for a logical "not" flag 224 indicated in the depicted embodiment by a tilde "~." If the logical "not" is present, the atom flag is inverted at block 226.

As disclosed herein, each comparison is transmitted as and comprised of an "atom" in the form: {location/operator/transmitted value}. As described below, the "location" portion of the atoms may include a function. As further described below, any number of atoms may be connected by Boolean operators. The address parsing routine depicted in FIG. 2 must account for any number of atoms. The result of the routine must be a final "True" or "False," which will control the execution or non-execution of the control instruction at that individual receiver. In order to yield a final True or False, the depicted flow chart illustrates a depicted embodiment which realizes any canonical logic function of the truth values of individual atoms. As will be recognized by those of skill in the art, groups of atoms connected by AND operators can also be connected, as groups, by Boolean OR operators. In other words, the address portion routine must maintain a current cumulative value of True or False for the atoms already processed. This cumulative value is updated at steps 228 and 232. First, at Block 238, the pre-existing True or False, represented by "AND_flag" is brought up to date by entering its equivalent, being, at this point of the flow chart, the current cumulative status plus the most recently evaluated atom, which is represented as "AND_flag '^' atom_flag." ('^' means "and.") So, for example, if the cumulative value of the previously evaluated atoms is True, and the currently evaluated atom is True, the cumulative value and the current atoms value are added at Blocks 228 to yield True.

If there is an AND indicator, 230, the next atom is evaluated, at 204.

Also, generating a cumulative value for realizing a canonical logic function must include step 232, where, the cumulative value "OR_flag," is updated as expressed, "OR_flag AND_flag." (means "or")

Next, the "OR_flag" is evaluated at 234. If the "OR_flag" is true, a "True" indication is returned for further processing 236. If the "OR_flag" is not true, the next token is checked 238 to see if it indicates a logical OR (","). If not, a "False"

indicator is returned 240. If so, the "AND_flag" is considered to be "True" 242 and the next atom is retrieved 204.

Figure 3:
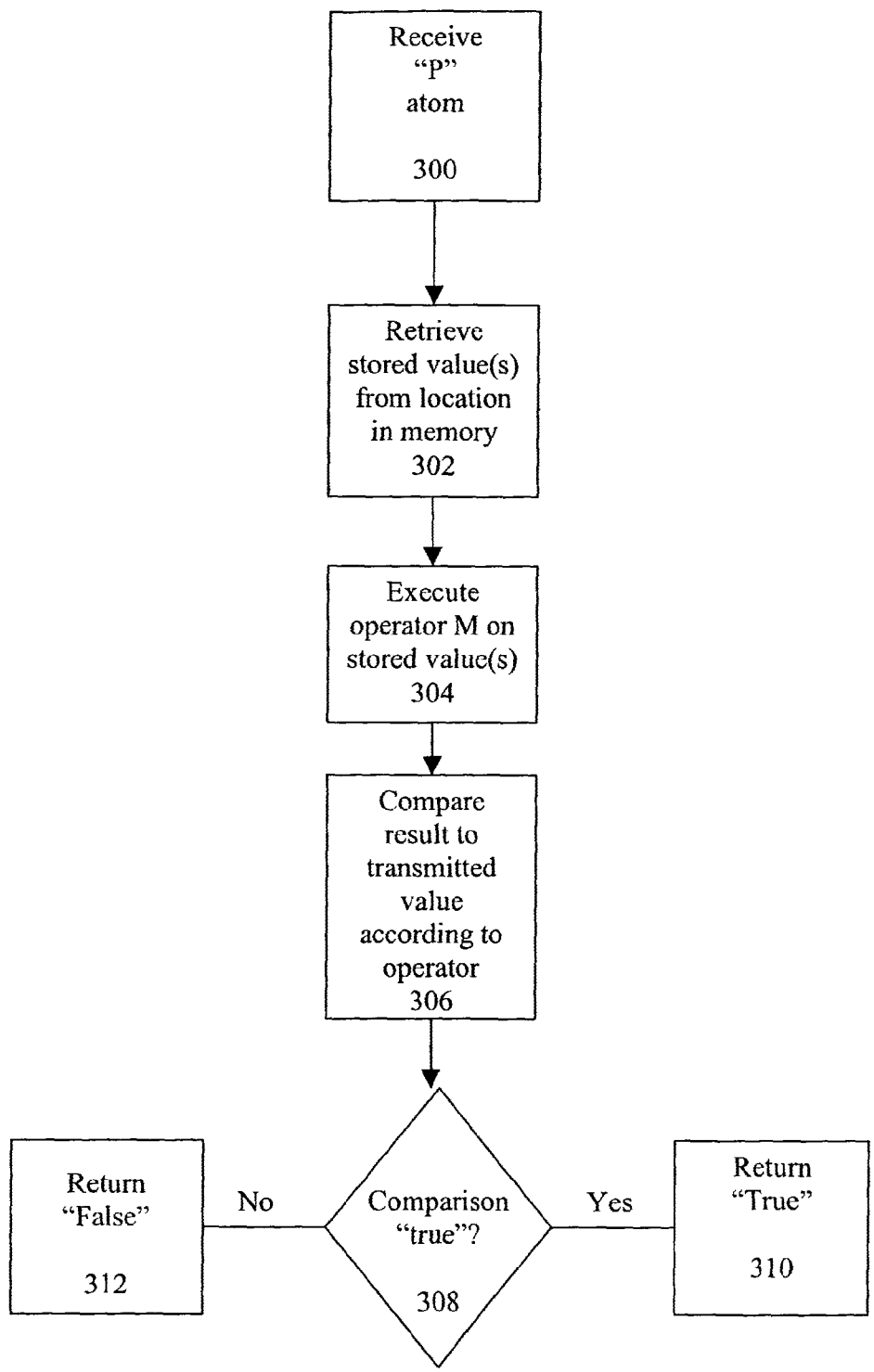
FIG. 3 is a flow chart of the routine for processing the content addressing portion of the data packet.

FIG. 3 is a flow chart depicting a subroutine corresponding to the box 222 in FIG. 2. The "P" atom is received 300 from header processor 104. The compare processor 106 executes a step of retrieving a stored value from a location in memory 302. The compare processor 106 next executes the transmitted function, if any, on the retrieved, stored value 304 to yield a result. Next the compare processor 106 compares 306 the transmitted value in the atom to the result, according to the comparison operator. The comparison of the result to the transmitted value in the atom will either be True or False 308. The True or False indication will be returned to an address parser 310, 312.

Figure 4:
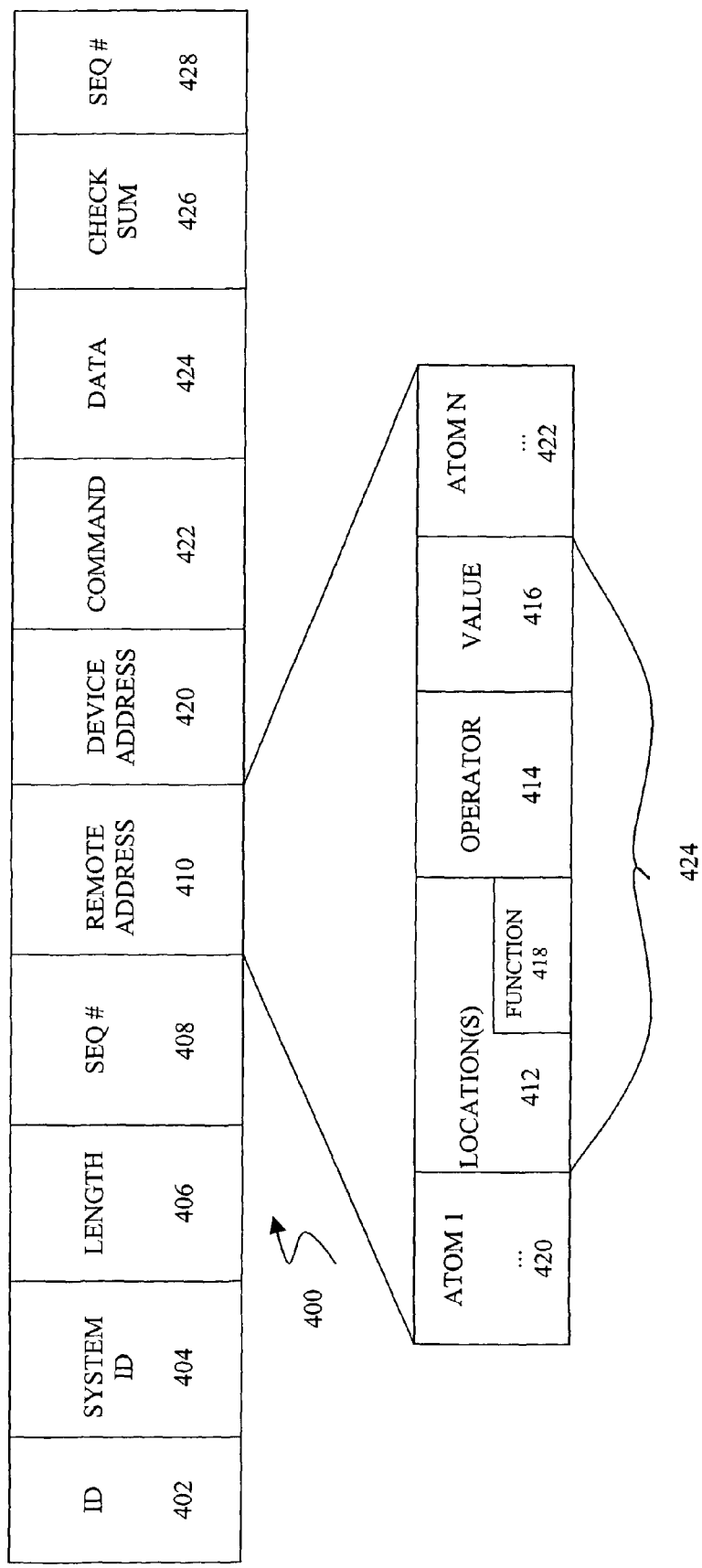
FIG. 4 is an illustration of a data packet addressing bit stream.

FIG. 4 is an illustration of the data transport stream 400. The data transport stream 400 is comprised of packets. The upper line of FIG. 4 illustrates the contents of a packet. Bytes are received in order from left to right. First received in data packet 400 is a frame separator identification constant 402. It may be, for example, 4 bytes long and may contain, for example, a repeated identifier of a manufacture of the equipment.

The next received are 4 bytes for system identification. This identification is constant within one control system, but varies from system to system. Length indicator 406 includes 2 bytes indicating the total number of bytes contained in the sequence number 408, remote address 410, device address 420, commands 422 and data 424 fields. Sequence number 408 is a one byte frame number field that increments for each new frame transmitted from a central control computer transmitter such as the satellite uplink. The remote address field 410 contains the operable components comprising the present invention, as described herein.

The device address field 420 is a 2 byte field indicating the logical device at the receiver to which a command is directed. Command field 422 is a field indicating an action such as a control instruction to be taken by the logical device specified in the preceding device address 420. The command field may be a single byte. It will contain a command value, which will mean different things according to the device to which it is addressed. For example a command value of 1 to a demodulator may instruct a change of frequency. A value of 2 may be an instruction to mute. A command value of 1 directed to a logical printer port may mean to send the data in the data field out to the printer port for printing.

Data field 424 is variable between 0 (as for a command that does not involve processing content data) to a length typically specified by a transport stream standard. For example, ISO/EEC 13818, the MPEG 2 standard, specifies a packet length of 188 bytes. Control instructions may be in multiple packets, concatenated with a first packet having a header containing the controlled addressing of the present invention in the remote address field. Check Sum field 426 is familiar to those skilled in the art. It would typically be 1 byte consisting of a logical exclusive OR of all bytes from the length field to the data field. Optional final sequence number 428 is a mirror of previous sequence number 408 and serves as a final verification.

The bottom line of FIG. 4 is an expansion of the remote address field 410. This includes location field 412, operator field 414 and a value field 416. The transmitted value 416 is to be compared with a stored value in a memory location in each individual receiver. Comparison will be according to the operator entered in the operator field 414. The location field 412 contains the identifying data, which may be an address, of the known preconfigured location in memory where the local parameters value is stored. The operators will include without limitation, "greater than," "less than," "greater than or equal to," "less than or equal to" and "not equal to," in addition to "equal to." The term "difference operator" as used herein will mean all operators except "equal to." The term "comparison operator" as used herein will mean all operators including "equal to." These comparison operators, used in a transmitted data packet, greatly expand the complexity of address instructions that can be executed, as compared to the extent of the prior art which was limited to an "equal to" operator. This is especially true in the previously known use with only a single, unmodifiable, unmanipulatable stored value.

The present invention increases the power and flexibility available for addressing not only by expanding the comparison operation beyond simply "equal to," but also by including downloadable functionality in the remote addressing. Function 418, illustrated in FIG. 4 as a subset of location 412, represents the compatibility of the present invention for including a function in the data structure transmitted to receivers across the network. A function, as used herein, is a logical, mathematical or arithmetical manipulation of one or more stored values. These functions include the standard operators, as for example standard in C compilers and include, without limitation, multiplication, division, addition, subtraction, square roots, exponents, shifting left or right, exclusive ORs. The function may be an arithmetical manipulation of only a single stored value, as, for example, a square root, or it may include a functional combination with transmitted number, as for example, times 2, or times pi. The function may act, within an individual atom, on a single stored value, or on multiple stored values, as, for example, X+Y.

Functionality as depicted herein is downloadable by its inclusion in a transport data stream. Alternatively, the function may be stored at a receiver, and called up for use by a storage identifying signal in the data transmission stream. Functionality may be achieved in a two step process. Stored values may be acted upon by an arithmetic function, yielding a result, and that result may be compared to a transmitted value with the comparison operator, as, for example, X+Y>50. Alternatively, the comparison operator may be "buried" in a data transport stream calling forth the function and thereafter loading into that function the comparison operator and filling variables with transmitted numbers and stored values. In any case, execution of both functionality and the comparison operator, in one step or in multiple steps, for each atom will yield a "True" or a "False."

Atoms may be connected by Boolean operators. Hence, ATOM 1 420 represents a first atom in a controlled remote address field, and ATOM N 422 represents a last atom. 424 represents the atom therein explained.

The "True" or "False" result for each atom is combined according to address parsing logic with the "True" or "False" results of other atoms in the remote addressing field. If the cumulative value is "True" the control instruction is executed.

In operation, the packet is processed according to known techniques. When the remote address field 410 is reached, it is processed in the compare processor 106 as follows. The location field 412 is referenced. That location in memory 108 is accessed and the stored value there is read. The compare processor reads the operator received in operator field 414 and receives the transmitted value in field 416. Comparison of the stored value and the transmitted value is executed according to the operator. This will yield either a True or a False. If True, the packet and the command instruction it contains in field 422 will be further processed for execution of the command. If not true, the command will not be executed. Accordingly, execution of particular commands only occurs at those individual receivers in which they are intended to be executed.

Controllable address atoms in the remote address field 410 may be connected with Boolean operators. If the first {location/operator/transmitted value} atom is true, the control processor may hold that true indicator while a {second location/operator/transmitted value} atom is received for execution. Those skilled in the art will appreciate the great expansion in the complexity of address instructions that is achieved by adding a relatively small number of location/operator/transmitted value atoms together.

For example, if programming content data is to be displayed only in receivers in the state of Montana, the address specification would locate the memory byte containing the stored state identification value. The comparison operator would be "equal to" and the value would be the value number preconfigured to represent Montana. If the stored value and the transmitted value are equal, the comparison is "true" because the receiver is in the state of Montana. Having received a true comparison, the processor then forwards the content data for further processing for use, which, in the case of broadcast television is viewing the program.

The content addressability "atoms" may also be connected by Boolean operators in order to execute more complex instructions. For example, if content data is a commercial and the commercial is to be shown at all sites of a chain store, except those stores in Montana, a first "atom" would have the local parameter identifier for the location of the "State byte" in the memory, and the operator "not." The atom is preceded by a negative indicator "~" in order to make the state of not Montana the True value. The stored value and the transmitted value would be the value number preconfigured to represent Montana. Accordingly, when the comparison is made, the comparison operator will be "true" for all receivers having a state parameter location containing a stored value that is not the Montana value. When the comparison operator is "false," the content data is not processed for use. In the example, then, all the Montana memory locations will be false and the commercial will not be shown in any store in Montana.

Next, the first atom is connected to a second atom by a Boolean operator, in this case, AND. A second "atom" has the address specification for the memory location configured to correspond to the particular retail chain. The comparison operator will be "equal to." Accordingly, for all stores not in Montana, in other words, for all receivers that have been "true" for the first "atom," if the memory location byte for the retail store group parameter contains the value preconfigured to represent the proper retail store group, the second atom comparison will also be true, and the content data will be further processed for use. The commercial will be shown at all of the retail chain stores not in Montana.

As will be readily appreciated by those skilled in the art, the complexity of control addressing according to the present invention is scalable. As a further example, if a sporting event is to be blacked out in a geographic region near the event venue, a control instruction could be sent containing an atom with a memory location address specification for a memory location recording a distance of that receiver/decoder unit from the event venue in question, which information has been previously stored. The comparison operator would be "greater than" and the value would be a distance, for example 50 miles. If these comparisons were true, the programming would proceed to processing for viewing.

If the distance to the relevant local sporting venue has not been stored previously, the content addressability of the present invention may be achieved by using atoms in the remote address field taking the following form.

A latitude measurement and comparison may be made in one atom and a longitude comparison may be made in a different atom. A single atom for evaluating latitude would include the memory location for the latitude local parameter. The function field would include a stored value for the local parameter, latitude, minus the venue latitude, a transmitted number. The comparison operator would be "greater than". The transmitted value would be the number of degrees latitude corresponding to the desired distance, for example, 5. Mathematically, the atom would be expressed $(5>ABS(Ls-Lv))$, where Ls is the stored value indicating the latitude of the receiver (station) and Lv is the transmitted number corresponding to the latitude of the venue. Numerically, if the receiver in question is at 8°, and the venue is at 10° latitude, the mathematical expression would be $(5>ABS(8-10))$. The function is the absolute value of 8-10, which is two. The comparison is that the transmitted value, 5° of latitude, is greater than the result of the function, 2° of latitude. This atom would return a true comparison, be flagged true and would have the blackout control instruction executed. The receiver is closer to the venue than the blackout radius, and so the game is blacked out for that receiver. A similar function would be executed for longitude and be connected with the latitude operator with a Boolean AND.

An alternative would be to transmit the latitude and the longitude of the venue and choose values A and B for appropriate distances. Accordingly a "box" may be constructed from two content addressable locations representing latitude and longitude. Control instructions containing four atoms would create the box. The atoms would be in the form (Lat<Y+A) AND (Lat>Y−A) AND (Long<X+B) AND (Long>X−B). X and Y represent the longitude and latitude of the venue and A and Y are chosen to result in the correct mileage deltas.

Those skilled in the art will recognize that increasing the complexity of the function will decrease the number of atoms necessary, and further leverage the storage and processing power that is distributed among the receivers, thereby saving a corresponding degree of storage and processing power necessary at a transmitting uplink. To return to the example of a sports blackout, another alternative solution is to include in the remote address field of the data transport stream the following function: $D=((Xs-Xv)^2+(Ys-Yv)^2)^{1/2}>R$, where Xs and Ys are the latitude and the longitude of the receive (station) and Xv and Yv are the latitude and longitude of the venue, R is the blackout radius, D is the distance and > is the comparison operator. Accordingly, the location section 412 of the remote addressing, field, will include the local parameter identifier for latitude, and the local parameter identifier for longitude. The function will be the function as described above. The comparison operator 414 is "greater than". The transmitted value 416 is R, the blackout radius. Of course, those with skill in the art will recognize the familiar sum of squares used to generate a distance value, which is the result of the function as applied to the stored values for the indicated local parameters, latitude and longitude. In this case, the function includes the arithmetic operators indicated, together with transmitted numbers corresponding to the latitude and longitude of the venue. If the distance D result of the function applied to the stored values is greater than the transmitted value R according to the comparison operator, then the entire atom will yield a "True" comparison, be flagged as such, and the control instruction to show the relevant sporting event will be further processed for execution.

As will also be recognized by those with skill in the art, the foregoing examples are illustrative, and while demonstrating the function and advantages of the present invention, do not limit its application. It is considered to be within the scope of the present invention to execute functionality executed upon stored values in any of a great variety of alternative techniques. For example, the comparison operator may be bundled with the functionality. A data stream may be transmitted that includes a function, followed by a comparison operator, followed by a transmitted value, followed by transmitted numbers for input into the function, followed by local parameter identifiers for stored values for input into the function. Expanding upon the example, a function may be transmitted, to be populated according to the following data stream in the remote address. Alternatively, a function may be stored at the receiver and a function memory location identifier may be transmitted for calling the function up from memory. In either case, by way of example, the function will be designated as F7 for the seventh function of the system. The comparison operator may be, to continue with the sporting event blackout example, less than. The transmitted value would be a blackout radius, for example 50 miles. The transmitted numbers would be the latitude and longitude of the venue. The transmitted local parameter identifiers would be identifiers for the memory location storing a value quantifying the local parameter. A compare processor would use these local parameter identifiers for calling up from memory the stored values, which are the latitude and longitude of the receiver. As recognized by those with skill in the art, the called out function, F7, followed by a stream of populating values, whether recalled from memory or transmitted, will execute in order to perform the arithmetic function indicated in the previous example and again yield a result of the function. In the present using the present data processing scheme, the execution of the function will also execute the comparison operator for comparison of the transmitted value with the function of the stored values in order to yield a False. Those of skill in the art will recognize that multiple input values, from multiple sources, can be acted upon by functions or operators.

In view of the foregoing, it will be seen that the several advantages of the invention are achieved and attained.

The embodiments were chosen and described in order to best explain the principles of the invention and its practical application to thereby enable others skilled in the art to best utilize the invention in various embodiments and with various modifications as are suited to the particular use contemplated.

As various modifications could be made in the constructions and methods herein described and illustrated without departing from the scope of the invention, it is intended that all matter contained in the foregoing description or shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed:

1. In a content data distribution network, a apparatus for directing control instructions to selected ones of a plurality of receivers, said apparatus comprising:
    a uplink processor;
    a memory;
    a plurality of local parameters, which may be stored in said memory, said parameters being variable among at least two of said plurality of receivers, at least one of said parameters representing a unique individual serial number of one of said plurality of receivers and at least one of said parameters represents descriptive data pertaining to said at least one of said plurality of receivers;
    a memory location in said memory corresponding to said local parameter in at least one of said plurality of receivers, wherein said local parameter may be stored;
    at least one stored Integrated Recorder/Decoder value, said stored Integrated Recorder/Decoder value quantifying said at least one local parameter for said plurality of receivers, said stored Integrated Recorder/Decoder value being stored in said memory location;
    an arithmetical function, said function modifying said at least one stored Integrated Recorder/Decoder value to produce a result, said arithmetical function being storable in said memory;
    a transmitted Integrated Recorder/Decoder value with said uplink processor being configured to transmit, said transmitted Integrated Recorder/Decoder value over said content data distribution network, and said transmitted Integrated Recorder/Decoder value being associated in said transmission with one of said local parameters; and
    a difference operator, said difference operator said uplink processor being configured to transmit over said content data distribution network said difference operator comparing said result to said transmitted Integrated Recorder/Decoder value;
    at least two atoms, at least one of said atoms containing a Boolean comparison of a transmitted value with a stored value and at least one of said atoms containing a Boolean comparison of a transmitted value with a result of said function, said atoms being concatenated with a next Boolean operator;
    said uplink processor being configured to transmit said arithmetical function, said transmitted value, said difference operator and said atoms to said plurality of receivers;
    such that said receivers may perform said arithmetical function and said comparisons according to said transmitted arithmetical function, said transmitted difference operator and said transmitted atoms;
    such that said control instructions are directed to said selected ones of said plurality of receivers according to said comparison of said atoms; and
    said atoms locating an integrated receiver/decoder being in the form (Lat<Y+A) AND (Lat>Y−A) AND (Long<X+B) AND (Long>X−B) where X and Y represent the longitude and latitude of a venue and A and Y are chosen to result in the correct mileage deltas.

2. The apparatus of claim 1 further comprising said atoms being transmitted within a single packet.

3. The apparatus of claim 1, wherein said transmission includes at least one local parameter identifier.

4. The apparatus of claim 3, wherein said at least one local parameter identifier identifies at least one of said memory locations.

5. The apparatus of claim 3, wherein said at least one local parameter identifier is an address for at least one of said memory locations.

6. The apparatus of claim 1 where said stored Integrated Recorder/Decoder value representing descriptive data relates to at least one of a membership in a group of receivers, a geographic location, a zip code, a listing on a programming schedule, a subscription to a programming package, and operational parameter, a status of a receiver, an indicator of which channel is on, an indicator of what audio is set, an indicator of the position of a relay, an indication of a receiver identity, and a billing status.

7. The apparatus of claim 1 wherein said transmitted Integrated Recorder/Decoder value relates to at least one of a membership in a group of receivers, a geographic location, a zip code, a listing on a programming schedule, a subscription to a programming package, and operational parameter, a status of a receiver, an indicator of which channel is on, an indicator of what audio is set, an indicator of the position of a relay, an indication of a receiver identity, a billing status or a serial number.

8. The apparatus of claim 1 wherein content data is played or said control instructions are executed when said comparison operator comparison yields said True value, and wherein said control instructions are not executed or said content data is not played when said comparison operator comparison does not yield a true value.

9. The apparatus of claim 1, wherein content data is played or said control instructions are executed when said comparison operator yields a first result, and wherein said control instructions are not executed or said content data is not played when said comparison operator yields a second result.

10. The apparatus of claim 1, wherein said control instructions, said transmitted Integrated Recorder/Decoder value and said comparison operator are transmitted together in a packet over said content data distribution network.

11. The apparatus of claim 1 wherein said function includes a second transmitted value.

12. The apparatus of claim 1 wherein said stored integrated recorder/decoder value is stored remote in time from an execution of at least one of said function producing said result or said comparison of said result to said transmitted integrated recorder/decoder value.

13. The apparatus of claim 1 further comprising at least one constant parameter stored in said memory.

14. The apparatus of claim 13, wherein said constant parameter is a unique individual serial number.

15. The apparatus of claim 1 further comprising said atoms locating said integrated receiver/decoder without input from a GPS apparatus.

16. In a content data distribution network, a apparatus for directing control instructions to selected ones, of a plurality of receivers, said apparatus comprising:
 a uplink processor;
 a memory;
 a plurality of local parameters, which may be stored in said memory said parameters being variable among at least two of said plurality of receivers, at least one of said parameters representing a unique individual serial number of one of said plurality of receivers and at least one of said parameters representing descriptive data pertaining to said at least one of said plurality of receivers;
 a memory location in said memory corresponding to said local parameter in at least one of said plurality of receivers wherein said local parameter may be stored;
 at least one stored Integrated Recorder/Decoder value, said stored Integrated Recorder/Decoder value quantifying said at least one local parameter for said plurality of receivers, said stored Integrated Recorder/Decoder value being stored in said memory location;
 an arithmetical function, said function modifying said at least one stored Integrated Recorder/Decoder value to produce a result; said arithmetical function being storable in said memory;
 a transmitted Integrated Recorder/Decoder value with said uplink processor being configured to transmit said transmitted Integrated Recorder/Decoder value over said content data distribution network, and said transmitted Integrated Recorder/Decoder value being associated in said transmission with one of said local parameters; and
 a difference operator, said difference operator said uplink processor being configured to transmit over said content data distribution network said difference operator comparing said result to said transmitted Integrated Recorder/Decoder value;
 at least two atoms, at least one of said atoms containing a Boolean comparison of a transmitted value with a stored value and at least one of said atoms containing a Boolean comparison of a transmitted value with a result of said function, said atoms being concatenated with a next Boolean operator;
 said processor being configured to transmit said arithmetical function, said transmitted value, said difference operator and said atoms to said plurality of receivers;
 such that said receivers may perform said arithmetical function and said comparisons according to said transmitted arithmetical function, said transmitted difference operator and said transmitted atoms;
 such that said control instructions are directed to said selected ones of said plurality of receivers according to said comparison of said atoms; and
 said atoms locating an integrated receiver/decoder being in the form $D=((Xs-Xv)^2+(Ys-Yv)^2)^{1/2}>R$, where Xs and Ys are the latitude and the longitude of the receive (station) and Xv and Yv are the latitude and longitude of a venue, R is the blackout radius, D is the distance and > is the comparison operator.

17. The apparatus of claim 16, wherein said transmission includes at least one local parameter identifier.

18. The apparatus of claim 17, wherein said at least one local parameter identifier identifies at least one of said memory locations.

19. The apparatus of claim 17, wherein said at least one local parameter identifier is an address for at least one of said memory locations.

20. The apparatus of claim 16 where said stored Integrated Recorder/Decoder value representing descriptive data relates to at least one of a membership in a group of receivers, a geographic location, a zip code, a listing on a programming schedule, a subscription to a programming package, and operational parameter, a status of a receiver, an indicator of which channel is on, an indicator of what audio is set, an indicator of the position of a relay, an indication of a receiver identity, and a billing status.

21. The apparatus of claim 16 wherein said transmitted Integrated Recorder/Decoder value relates to at least one of a membership in a group of receivers, a geographic location, a zip code, a listing on a programming schedule, a subscription to a programming package, and operational parameter, a status of a receiver, an indicator of which channel is on, an indicator of what audio is set, an indicator of the position of a relay, an indication of a receiver identity, a billing status or a serial number.

22. The apparatus of claim 16 wherein content data is played or said control instructions are executed when said comparison operator comparison yields said True value, and wherein said control instructions are not executed or said content data is not played when said comparison operator comparison does not yield a true value.

23. The apparatus of claim 16, wherein content data is played or said control instructions are executed when said comparison operator yields a first result, and wherein said control instructions are not executed or said content data is not played when said comparison operator yields a second result.

24. The apparatus of claim 16, wherein said control instructions, said transmitted Integrated Recorder/Decoder value and said comparison operator are transmitted together in a packet over said content data distribution network.

25. The apparatus of claim 16 wherein said function includes a second transmitted value.

26. The apparatus of claim 16 wherein said stored integrated recorder/decoder value is stored remote in time from an execution of at least one of said function producing said result or said comparison of said result to said transmitted integrated recorder/decoder value.

27. The apparatus of claim 16 further comprising at least one constant parameter stored in said memory.

28. The apparatus of claim 16, wherein said constant parameter is a unique individual serial number.

29. The apparatus of claim 16 further comprising said atoms locating said integrated receiver/decoder without input from a GPS apparatus.

30. The apparatus of claim 16 wherein said atoms are transmitted in a single packet.

* * * * *